(12) United States Patent
Richardson et al.

(10) Patent No.: US 10,615,014 B2
(45) Date of Patent: Apr. 7, 2020

(54) DATA DEPENDENT MS/MS ANALYSIS

(71) Applicant: Micromass UK Limited, Wilmslow (GB)

(72) Inventors: Keith Richardson, Derbyshire (GB); Jason Lee Wildgoose, Stockport (GB)

(73) Assignee: Micromass UK Limited, Wilmslow (GB)

( * ) Notice: Subject to any disclaimer, the term of this patent is extended or adjusted under 35 U.S.C. 154(b) by 820 days.

(21) Appl. No.: 15/035,935

(22) PCT Filed: Nov. 11, 2014

(86) PCT No.: PCT/GB2014/053338
§ 371 (c)(1),
(2) Date: May 11, 2016

(87) PCT Pub. No.: WO2015/071651
PCT Pub. Date: May 21, 2015

(65) Prior Publication Data
US 2016/0254129 A1   Sep. 1, 2016

(30) Foreign Application Priority Data

Nov. 12, 2013 (EP) .................................... 13192559
Nov. 12, 2013 (GB) ................................. 1319939.3

(51) Int. Cl.
*H01J 49/00* (2006.01)
*G01N 15/10* (2006.01)
(Continued)

(52) U.S. Cl.
CPC ...... *H01J 49/0036* (2013.01); *G01N 15/1031* (2013.01); *H01J 49/0031* (2013.01);
(Continued)

(58) Field of Classification Search
CPC ........ H01J 49/00; H01J 49/02; H01J 49/0045; H01J 49/005; H01J 49/025; H01J 49/26
(Continued)

(56) References Cited

U.S. PATENT DOCUMENTS 6,717,130 B2   4/2004   Bateman et al.
7,112,784 B2   9/2006   Bateman et al.
(Continued)

OTHER PUBLICATIONS

"*Introduction to Mass Spectrometry, Chapter 3: Mass Spectrometry/Mass Spectrometry*", Introduction to Mass Spectrometry, pp. 173-228, 2007.
(Continued)

*Primary Examiner* — Jason L McCormack (57) ABSTRACT

A method of mass spectrometry is disclosed comprising comparing mass spectral data so as to identify a precursor ion in the mass spectral data that has a predetermined mass difference to a product ion in the mass spectral data; and determining whether said precursor ion is a precursor ion of interest by comparing the ion signal profile for the precursor ion with the ion signal profile for the product ion. If the profiles match then the precursor ion is determined to be an ion of interest. When a precursor ion is determined to be an ion of interest, the precursor ion is isolated from other precursor ions, fragmented or reacted so as to produce product ions, and the product ions are analysed so as to obtain product ion data that can be used to identify the precursor ion.

20 Claims, 3 Drawing Sheets

(51) Int. Cl.
*G01N 15/00* (2006.01)
*G01N 27/62* (2006.01)

(52) U.S. Cl.
CPC ........ *H01J 49/0045* (2013.01); *G01N 27/622* (2013.01); *G01N 2015/0003* (2013.01); *G01N 2015/1043* (2013.01)

(58) Field of Classification Search
USPC ................................................ 250/281, 282
See application file for complete search history.

(56) References Cited

U.S. PATENT DOCUMENTS

| | | |
|---|---|---|
| 7,511,267 B2 | 3/2009 | Zabrouskov |
| 7,622,711 B2 | 11/2009 | Wildgoose et al. |
| 8,447,527 B2 | 5/2013 | Gorenstein et al. |
| 8,822,914 B2 | 9/2014 | Goshawk et al. |
| 9,190,251 B2 | 11/2015 | Green et al. |
| 9,299,548 B2 | 3/2016 | Bonner et al. |
| 9,312,110 B2 | 4/2016 | Geromanos et al. |
| 2011/0121172 A1* | 5/2011 | Savitski .............. H01J 49/0045 250/282 |
| 2012/0172255 A1* | 7/2012 | Haberger ............... G01N 33/50 506/12 |
| 2012/0253684 A1* | 10/2012 | Gorenstein ............ G01N 30/72 702/19 |
| 2014/0142865 A1 | 5/2014 | Wright |
| 2015/0041636 A1 | 2/2015 | Giles et al. |

OTHER PUBLICATIONS

Steiner et al., "*Electrospray Ionization with Ambient Pressure Ion Mobility Separation and Mass Analysis by Orthogonal Time-of-Flight Mass Spectrometry*", Rapid Communications in Mass Spectrometry, vol. 15, No. 23, pp. 2221-2226, 2001.

\* cited by examiner

DATA DEPENDENT MS/MS ANALYSIS

CROSS REFERENCE TO RELATED APPLICATIONS

This application is the National Stage of International Application No. PCT/GB2014/053338, filed 11 Nov. 2014 which claims priority from and the benefit of United Kingdom patent application No. 1319939.3 filed on 12 Nov. 2013 and European patent application No. 13192559.6 filed on 12 Nov. 2013. The entire contents of these applications are incorporated herein by reference.

BACKGROUND TO THE PRESENT INVENTION

Approaches such as $MS^e$ have proven useful in unbiased high sensitivity MSMS applications. In $MS^e$ the ion population is repeatedly switched between two or more modes of operation. In one of these modes of operation the ion population remains substantially un-fragmented and thus predominately consists of precursor ions. In another one of these modes, the ion population undergoes fragmentation and thus the resulting population predominately consists of product ions. The two or more populations are acquired using a mass spectrometer and product ions are assigned to precursor ions based on chromatographic precursor peak profile characteristics such as liquid chromatography retention time or peak shape. Whilst this approach has proven useful it does suffer from limited precursor ion to product ion assignment specificity in complex mixtures due to the relatively low peak capacity or resolution of the liquid chromatographic separation.

Data directed analysis (DDA) has conventionally been seen as an alternative approach to $MS^e$. In DDA techniques, a MS survey scan is used to identify components of interest and once these components have been identified they are isolated using a mass filter, for example a quadrupole mass filter, before undergoing fragmentation and fragment ion mass analysis. The information in the fragment ion mass spectra, together with the precursor ion information, leads to a highly specific/selective experiment. However, the survey scan in a DDA technique is relatively slow and has a low duty cycle as only a single precursor ion can be analysed at a time.

It is therefore desirable to provide an improved method of mass spectrometry and an improved mass spectrometer.

SUMMARY OF THE PRESENT INVENTION

From a first aspect the present invention provides a method of mass spectrometry comprising:

using a separator to provide a plurality of separated precursor ions;

mass analysing the separated precursor ions in a first mode so as to obtain first mass spectral data; wherein the first mode comprises detecting precursor ions and recording an ion signal as a function of elution time of the separator;

performing a second mode of operation comprising subjecting the separated precursor ions to reactions or fragmentation so as to produce product ions, and mass analysing the product ions so as to obtain second mass spectral data; wherein the second mode comprises detecting product ions and recording an ion signal as a function of elution time of the separator;

selecting a predetermined mass difference desired to be detected between a precursor ion in the first mass spectral data and a product ion in the second mass spectral data;

comparing the first and second mass spectral data so as to identify a precursor ion in the first mass spectral data that has said predetermined mass difference to a product ion in the second mass spectral data; and determining whether said precursor ion is a precursor ion of interest by comparing the ion signal obtained in the first mode with the ion signal obtained in the second mode;

wherein when a precursor ion is determined to be an ion of interest, said method further comprises a third mode in which said precursor ion of interest is isolated from other precursor ions, the isolated precursor ion is then fragmented or reacted so as to produce product ions, and the product ions are analysed so as to obtain product ion data.

The present invention provides an efficient and reliable manner of determining that precursor and product ions are related, and consequently for determining which precursor ions are of interest. As the present invention determines whether the precursor ion is an ion of interest by comparing the ion signal obtained in the first mode with the ion signal obtained in the second mode, and not just based on the mass difference between the precursor and product ions, the likelihood of falsely identifying an ion of interest is significantly reduced. When the precursor ion of interest is determined to be present, the method then goes on to isolate, and fragment or react the precursor ion. This leads to a highly specific/selective experiment.

Steiner et al "Electrospray ionization with ambient pressure ion mobility separation and mass analysis by orthogonal time-of-flight mass spectrometry" (RAPID COMMUNICATIONS IN MASS SPECTROMETRY, Vol. 15, No. 23, 15 Dec. 2001 (2001-12-15), pages 2221-2226, XP055141230) discloses a method of mass spectrometry in which the ion mobilities and mass to charge ratios of parent ions are analysed. The parent ions may also be fragmented and the fragment ions analysed. Parent ions may then be assigned to fragment ions that are detected and that correspond to fragment ions which are expected to be generated from the parent ions.

However, Steiner et al does not disclose selecting a predetermined mass difference desired to be detected between a precursor ion in first mass spectral data and a product ion in second mass spectral data, and comparing the first and second mass spectral data so as to identify a precursor ion in the first mass spectral data that has said predetermined mass difference to a product ion in the second mass spectral data. Rather, the method of Steiner et al. simply looks for fragment ions that might be expected to be generated at specific mass to charge ratios. Furthermore, Steiner et al does not disclose that when a precursor ion is determined to be an ion of interest, the precursor ion of interest is isolated from other precursor ions, fragmented or reacted so as to produce product ions, and the product ions analysed so as to obtain product ion data. As such, the method of Steiner et al does not have the advantages of the present invention.

The method of the present invention preferably comprises identifying the isolated precursor ion using said product ion data. This may be achieved, for example, by comparing the product ion data to a library of precursor ions, wherein the library includes a list of precursor ions and their related product ion data. The experimentally obtained product ion data obtained by the present invention may then be compared to the library so as to identify a precursor ion from which the product ion data is likely to have been derived.

The predetermined mass difference between the precursor and product ions is preferably a difference in mass to charge ratio. The predetermined mass difference may be a value having a tolerance window about that value, i.e. it may be a mass range.

Said reactions that produce the product ions may include ion-ion reactions, such as: electron transfer dissociation (ETD), electron capture dissociation (ECD), electron impact dissociation (EID), proton transfer reaction (PTR), charge reduction & supercharging, charge enhancement, hydrogen-deuterium exchange (HDX) or general adducting.

The fragmentation process in the second mode of operation may be Collision Induced Dissociation ("CID"), Electron Transfer Dissociation ("ETD"), Electron Capture Dissociation ("ECD") or any other fragmentation technique.

The separator may be an ion mobility separator, a liquid chromatography device, a gas chromatography device, or a scanned differential mobility device such as a FAIMS device. However, other types of separators are also contemplated which may separate the precursor ions by one or more other physicochemical properties. For example, the separator may be a mass to charge ratio separator or an ion filtering device such as a mass to charge ratio filtering device.

The step of providing a plurality of precursor ions may comprise providing a plurality of different precursor ions to said separator and separating different precursor ions from each other in said separator. Alternatively, the step of providing a plurality of precursor ions may comprise providing analyte molecules to said separator, separating different analyte molecules from each other in said separator, and ionising said separated analyte molecules so as to provide said plurality of separated precursor ions.

Preferably, said step of providing a plurality of precursor ions comprises: providing analyte molecules to said separator, separating different analyte molecules from each other in said separator, ionising said separated analyte molecules so as to provide a plurality of separated precursor ions, and further separating the resulting precursor ions in an ion separator. Alternatively, the step of providing a plurality of precursor ions may comprise separating the precursor ions in a first ion separator and then separating the resulting ions in a second, different type of ion separator.

Preferably, the step of determining if the precursor ion is an ion on interest comprises: identifying at least a portion of the ion signal obtained in the first mode that corresponds to or includes said precursor ion; identifying at least a portion of the ion signal obtained in the second mode that corresponds to or includes said product ion; and comparing the elution times of these ion signals and/or comparing the shape of the intensity profiles of these ion signals and/or comparing a shape-related parameter of the intensity profiles of these ion signals.

Preferably, the precursor ion is considered to be an ion of interest if the elution times of the ion signals match and/or the shapes of the intensity profiles match and/or the shape-related parameter of the intensity profiles match.

The precursor ion may be considered to be an ion of interest if the elution time of the ion signal for said precursor ion is substantially the same as the elution time of the ion signal for the product ion. Additionally, or alternatively, in order for the precursor ion to be considered to be an ion of interest, the shape of the intensity profile for said precursor ion is preferably substantially the same as shape of the intensity profile for the product ion.

Preferably, the first mode comprises recording the ion signal intensity of the precursor ions as a function of elution time of the separator so as to obtain a first ion signal intensity profile, the second mode comprises recording the ion signal intensity of the product ions as a function of elution time of the separator so as to obtain a second ion signal intensity profile, and the step of determining whether the precursor ion is a precursor ion of interest comprises comparing the first and second ion intensity profiles to determine if they match. If the signals match then the precursor ion is determined to be an ion of interest.

Preferably, said precursor ion is considered to be an ion of interest if said at least a portion of the ion signal obtained in the first mode and said at least a portion of the ion signal obtained in the second mode have substantially the same elution time, or span over substantially the same range of elution times; and/or if the shape or shape-related parameter of said at least a portion of the ion signal obtained in the first mode matches the shape or shape-related parameter of said at least a portion of the ion signal obtained in the second mode over substantially the same elution time period.

The precursor ion may be considered to be an ion of interest if the ion signal for the precursor ion is represented by a first peak and the ion signal for the product ion is represented by a second peak, and the full width half maximum and/or standard deviation and/or skew and/or kurtosis and/or higher order moments of the first peak match that of the second peak.

In other words, the shape-related parameter may be the full width half maximum, standard deviation, skew, kurtosis, or higher order moments of the ion signal peaks.

The benefit of matching profiles can, for example, allow discrimination of charge states in ion mobility experiments, where higher charge state precursor ions have narrower IMS peak widths than lower charge states at the same drift time. Measuring these peak widths or calculating values related to or based on these peak widths can help prevent mis-triggering of the third mode (i.e. the MSMS experiment).

Similar effects are known for chromatographic separations where peak shape can change as a function of the amount of sample on the chromatographic column or as a result of unwanted secondary interactions, especially basic and acidic compounds that undergo ion exchange or interaction with metal contaminants in the silica-based stationary phase. Other sources of observed peak shape variation include instrument related limitations such as ionisation efficiency, where different concentrations and hydrophobicity can affect the ionisation efficiency as a function of elution time. Other instrument effects include ion current or charge limitations of ion guides again effecting the transmission as a function of intensity and hence elution time.

Preferably, said ion signal obtained in the first mode that corresponds to or includes said precursor ion comprises a peak in the ion signal; said ion signal obtained in the second mode that corresponds to or includes said product ion comprises a peak in the ion signal; and said step of determining whether said precursor ion is a precursor ion of interest comprises comparing the shape or shape-related parameter of only a portion of the peak obtained in the first mode with the shape or shape-related parameter of only a portion of the peak obtained in the second mode; and the method comprises determining that said precursor ion is a precursor ion of interest when the shapes or shape-related parameter of the peak portions match.

The method may comprise comparing the peak portions and switching to said third mode, if the shape or shape-related parameters of the peak portions match, before one or both peaks have fully eluted from the separator.

A particularly preferred feature of the present invention is the ability to switch into the third mode (MSMS mode) in real time precluding the ability to measure an entire chromatographic or IMS peak. In these instances only a partial chromatogram peak is available to make the switching decision and in these cases the shape or shape-related parameter of the partial chromatographic profile is important in increasing confidence in the switching decision. In the case of partial chromatograms, the shape-related parameter may take the form of best fit equations such as polynomial equations or exponential equations, profile intensities as a function of time, or simple correlation approaches to compare fragment ion data and precursor ion data.

When a precursor ion is considered to be an ion of interest, said precursor ion is isolated from all other ions. The precursor ion may be isolated by mass filtering the precursor ions, e.g. by only transmitting the ion of interest downstream of the mass filter. Preferably, other ions that are not ions of interest are not subjected to further analysis and may be discarded.

The isolated precursor ion may be identified using the product ion data. This enables the ion of interest to be identified, as in an MS/MS experiment.

The isolated ions may be fragmented via Collision Induced Dissociation ("CID"), Electron Transfer Dissociation ("ETD"), Electron Capture Dissociation ("ECD") or any other fragmentation technique. The isolated ions may be fragmented by the same fragmentation technique, or a different fragmentation technique, to the fragmentation technique used in the second mode of operation.

Therefore, the isolated ions may be fragmented by a different fragmentation technique to the fragmentation technique used in the second mode of operation.

Although the present invention has been described as identifying a mass difference between a single pair of precursor and product ions, the present invention may analyse the mass differences between each (or a plurality of) different precursor ion in the first mass spectral data and all (or multiple) product ions in the second mass spectral data. The comparison between the first and second mass spectral data, or the comparison between the ion signals obtained in the first and second modes, may lead to precursor ions not being considered to be ions of interest.

Preferably, the precursor ion is considered not to be an ion of interest if the elution time of the ion signal obtained for said precursor ion is substantially different to the elution time of the ion signal obtained for said product ion. Alternatively, or additionally, the precursor ion is considered not to be an ion of interest if the shape of the intensity profile obtained for said precursor ion is substantially different to the shape of the intensity profile obtained for said product ion Preferably, when a precursor ion is considered not to be an ion of interest: the precursor ion is not isolated from other precursor ions. Alternatively, the precursor ion is isolated from other precursor ions but is not fragmented after isolation. Alternatively, the precursor ion is isolated from other precursor ions and is then fragmented, but the resulting fragment ions are not analysed. Alternatively, the precursor ion is isolated from other precursor ions and is then fragmented, and the resulting fragment ions are analysed, but the resulting data is discarded or labelled as void.

The method preferably comprises repeatedly alternating the method between said first and second modes of operation.

The method preferably alternates between the two modes as the precursor ions/molecules elute from the separator.

The method preferably alternates between the first and second modes in an $MS^e$ manner. Less preferably, all of the precursor ions may be analysed in the first mode before the method is alternated so as to operate in the second mode, during which the product ions of all of the precursor ions are analysed.

Preferably, the method is continuously alternated between the first and second modes, and the method then switches from either said first or said second mode into said third mode when a precursor ion is determined to be an ion of interest such that that precursor ion is then isolated from other precursor ions and is fragmented or reacted so as to produce said product ion data.

Preferably, the precursor ion is determined to be an ion of interest and the method switches to said third mode substantially in real time.

Said separator is preferably an ion separator and the method may comprises repeatedly pulsing precursor ions into the ion separator, operating the method only in the first mode whilst ions from a first pulse elute from the ion separator and operating the method only in the second mode whilst ions from a second pulse elute from the ion separator.

Said predetermined mass difference is preferably a mass that represents a neutral loss that is known to occur from at least one of said precursor ions when subjected to said reactions or fragmentation in the second mode of operation.

The mass difference caused by the neutral loss may be constant whatever the mass to charge ratio of the precursor ions, e.g. if the precursor ions are singly charged ions. Alternatively, the neutral loss may cause different changes in mass to charge ratio for precursor ions of different mass to charge ratio, e.g. if the precursor ions are multiply charged. Examples of neutral losses are the loss of a water molecule of the loss on an $NH_3$ group. Other neutral losses are also contemplated. Alternatively, the mass difference may be a neutral gain or the adduct of an ion.

The present invention can be used to prevent precursor ions being isolated and/or fragmented when the precursor ions are not confirmed as relating to the product ions. Alternatively, the present invention may halt the isolation of the precursor ions, halt the fragmentation of the precursor ions, or halt the analysis of the fragment ions once it has been confirmed that the precursor and product ions are not related to each other. Alternatively, if precursor ions are determined not to be related to the product ions, and the precursor ions have been isolated, fragmented and analysed, then the resulting data may be discarded or labelled as void.

The ion separator may be an ion mobility separator. The ion mobility separator may comprise a gas that separates the ions according to their ion mobility as they pass through the gas. Alternatively, other ion mobility separator devices such as differential mobility analyser (DMA) or differential mobility spectrometer (DMS) may be used.

The ions are preferably analysed by a ToF mass analyser. The invention can work in combination with other established ToF enhancements, such as Enhanced Duty Cycle (EDC) or High Duty Cycle (HDC) techniques. EDC is a method that allows the duty cycle, and thus sensitivity, of an orthogonal acceleration ToF instrument to be enhanced over a restricted range of mass to charge ratios by synchronising the pusher firing with the arrival time at the pusher of target ions repeatedly released in packets from a gas cell. The ions may be conveyed through the gas cell by travelling electrical potential wells/barriers that maintain the ions in packets. These packets may then be released into the TOF analyser. The mass to charge ratio that is enhanced depends on the delay time from packet release to pusher firing as the ions undergo a small amount of time of flight separation as they travel from gas cell to the pusher region. This delay can be varied within an IMS cycle time so as to take advantage of the correlation between IMS drift time and mass to charge ratio for a given charge state. The varying of the delay within the IMS cycle time leads to enhanced duty cycle for all ions of all mass to charge ratios within a given charge state and is called High Duty Cycle (HDC).

The collision energy of the ions in the high fragmentation mode may be varied as a function of elution time from the ion separator, e.g, as a function of drift time through an ion mobility separator. For example, the collision energy may be varied as a function of drift time as described in U.S. Pat. No. 7,622,711B2.

The device may be preceded by or followed by a wide range of known ionisation sources, fragmentation techniques or analysers.

The precursor ions may be separated by one or more types of ion separation device. For example, the precursor ions may be separated by liquid chromatography and then by an ion mobility separator. The elution profiles from the multiple separation devices may be used to determine if the precursor ions are related to the product ions. The use of multiple separation devices improves the confidence in the determination of whether or not the precursor and product ions are related.

The present invention may also be used to help prevent redundant triggering on different charge states of the same species. For example, the elution profile may be used to identify different precursor charge states from the same species and this information may then be used to avoid triggering on both.

The isolation of the precursor ions for the MS/MS analysis may be restricted to ions in a restricted range of elution times (e.g. drift times) so as to improve specificity and potentially duty cycle of the experiment, e.g. as described more fully in WO 2013/140132.

Although embodiments have been described based on neutral loss triggered experiments, other types of transition may be detected so as to trigger the experiment such as, for example, precursor ion discovery or multiple reaction monitoring (MRM). It will be appreciated that the preferred embodiment of the present invention allows for precursor ion discovery. One or more product ion mass may be monitored for and, if and when it appears, the method identifies potential precursor ions having the predetermined mass difference from the product ion. This may then trigger one or more MS/MS acquisition of the identified precursor ion so as to confirm or identify the precursor ion.

For MRM, a list of transitions and retention times may be predetermined. At a given retention time, the precursor ion data and product ion data may be interrogated for potential ones of the listed transitions, wherein each transition is considered to result in a predetermined mass difference between the related precursor ion and product ion. If the precursor and parent ion data indicates that one of the listed transitions may have occurred then this may trigger one or more MS/MS scans for confirmation. Checking the elution profiles of ions identified as potentially representing a transition again reduces the likelihood of false triggering.

From a second aspect, the present invention provides a method of mass spectrometry comprising:

generating a plurality of species of precursor ions;

mass analysing the precursor ions so as to obtain first mass spectral data;

varying the intensity profile of one or more species of precursor ions as a function of time so that different species of precursor ions are caused to have different intensity profiles as a function of time;

performing a second mode of operation comprising subjecting precursor ions to reactions or fragmentation so as to produce product ions, and mass analysing the product ions so as to obtain second mass spectral data including intensity profiles that vary as a function of time;

selecting a predetermined mass difference desired to be detected between a precursor ion in the first mass spectral data and a product ion in the second mass spectral data;

comparing the first and second mass spectral data so as to identify a precursor ion in the first mass spectral data that has said predetermined mass difference to a product ion in the second mass spectral data; and determining whether said precursor ion is an ion of interest by determining if the intensity profile of said precursor ion matches the intensity profile of said product ion;

wherein when a precursor ion is determined to be an ion of interest, said method further comprises a third mode in which said precursor ion of interest is isolated from other precursor ions, the isolated precursor ion is then fragmented or reacted so as to produce product ions, and the product ions are analysed so as to obtain product ion data.

Said step of varying the intensity profile of one or more species of precursor ions as a function of time may comprise subjecting an analyte sample to chromatography; and said precursor ion may be matched to said product ion by matching chromatographic elution time profiles of the precursor ion and product ion. Alternatively, said step of varying the intensity profile of one or more species of precursor ions as a function of time may comprise separating the precursor ions in an ion mobility spectrometer, and the precursor ion may be matched the product ion by matching ion mobility drift time profiles of the precursor ion and product ion.

The method according to the second aspect of the invention may have any one or combination of the preferred or optional features described above in relation to the first aspect of the present invention.

It is contemplated that the instrument need not be switched between high and low fragmentation or reaction modes, but that it may operate in an intermediate state that causes some, but not all, of the ions to fragment or react so as to provide a mixed precursor and product ion spectra.

Accordingly, from a third aspect the present invention provides a method of mass spectrometry comprising:

using a separator to provide a plurality of separated precursor ions;

passing the separated precursor ions into a fragmentation or reaction region and fragmenting or reacting the ions in a manner such that only some of the precursor ions fragment or react at any given time so as to result in both first precursor ions and first product ions;

mass analysing the first precursor ions and first product ions so as to obtain mass spectral data; wherein the mass analysis comprises detecting the first precursor ions and first product ions, and recording an ion signal as a function of elution time of the separator;

selecting a predetermined mass difference desired to be detected between a precursor ion in the mass spectral data and a product ion in the mass spectral data;

comparing the mass spectral data so as to identify a precursor ion in the mass spectral data that has said predetermined mass difference to a product ion in the mass spectral data; and determining whether this precursor ion is an ion of interest by comparing the ion signal obtained for the identified precursor ion with the ion signal obtained for the product ion having the predetermined mass difference;

wherein when a precursor ion is determined to be an ion of interest, said method further comprises a mode in which said precursor ion of interest is isolated from other precursor ions, the isolated precursor ion is then fragmented or reacted so as to produce product ions, and the product ions are analysed so as to obtain product ion data.

The method is substantially the same as the previously described method, except that the method does not alternate between the first mode (in which precursor ions are detected without being fragmented or reacted) and the second mode (in which precursor ions are fragmented or reacted). Rather, a single mode is operated and only some of the precursor ions are fragmented or reacted at any given time. As such, the subsequently detected spectral data from this single mode includes both precursor ions data and product ions data and can be used to identify ions of interest. Predetermined characteristics, such as mass to charge ratio, may be used to determine which ions in the spectral data are precursor ions and which are product ions. Alternatively, where two ions are separated by the predetermined mass difference, the higher mass ion may be assumed to be a precursor ion and the lower mass ion may be assumed to be a product ion.

This method may have optional features that correspond to those described in relation to the first aspect of the present invention, except wherein the method operates in a single mode.

For example, the separator may be an ion mobility separator, a liquid chromatography device, a gas chromatography device, or a scanned differential mobility device such as a FAIMS device.

The step of providing a plurality of precursor ions may comprise: providing a plurality of different precursor ions to said separator and separating different precursor ions from each other in said separator; or providing analyte molecules to said separator, separating different analyte molecules from each other in said separator, and ionising said separated analyte molecules so as to provide said plurality of separated precursor ions.

The step of determining if the precursor ion is an ion on interest may comprises:

identifying at least a portion of the ion signal obtained that corresponds to or includes said precursor ion;

identifying at least a portion of the ion signal that corresponds to or includes said product ion; and comparing the elution times of these ion signals and/or comparing the shape of the intensity profiles of these ion signals.

Preferably, the precursor ion is considered to be an ion of interest if the elution times of the ion signals match and/or the shapes of the intensity profiles match.

Preferably, when a precursor ion is considered to be an ion of interest, said precursor ion subjected to further analysis.

Preferably, when a precursor ion is considered to be an ion of interest, said precursor ion is isolated from other precursor ions.

The isolated precursor ion may be fragmented or reacted so as to produce product ions, and these product ions may then analysed to obtain product ion data.

The isolated precursor ion may then be identified using the product ion data.

The isolated ions may be fragmented by a different fragmentation technique to the fragmentation technique used in the second mode of operation.

The predetermined mass difference may be a mass that represents a neutral loss that is known to occur from at least one of said precursor ions when subjected to said reactions or fragmentation. The mass difference caused by the neutral loss may be constant whatever the mass to charge ratio of the precursor ions, e.g. if the precursor ions are singly charged ions. Alternatively, the neutral loss may cause different changes in mass to charge ratio for precursor ions of different mass to charge ratio, e.g. if the precursor ions are multiply charged. Alternatively, the mass difference may be a neutral gain or the adduct of an ion.

A method for precursor ion discovery is also contemplated in the present invention.

Accordingly, from a fourth aspect, the present invention provides a method of mass spectrometry comprising:

using a separator to provide a plurality of separated precursor ions;

mass analysing the separated precursor ions in a first mode so as to obtain first mass spectral data; wherein the first mode comprises detecting precursor ions and recording an ion signal as a function of elution time of the separator;

performing a second mode of operation comprising subjecting the separated precursor ions to reactions or fragmentation so as to produce product ions, and mass analysing the product ions so as to obtain second mass spectral data; wherein the second mode comprises detecting product ions and recording an ion signal as a function of elution time of the separator;

determining if one or more predetermined product ion has been detected in the second mass spectral data; and determining whether a potential precursor ion of said predetermined product ion has been detected in said first mass spectral data by comparing the ion signal obtained in the first mode with the ion signal obtained in the second mode.

Preferably, when said potential precursor ion has been detected, said method further comprises isolating said potential precursor ion from other precursor ions, fragmenting or reacting said potential precursor ion so as to produce product ions, and analysing the resulting product ions so as to obtain product ion data.

The method may further comprise identifying the potential precursor ion using the product ion data.

The method may comprise identifying at least a portion of the ion signal obtained in the second mode that corresponds to or includes said predetermined product ion; and determining a precursor ion in the ion signal obtained in the first mode as said potential precursor ion if its ion signal has an elution time and/or intensity profile shape that corresponds to an elution time and/or intensity profile shape of the ion signal for the predetermined product ion.

The mass to charge ratio of the predetermined product ion may be know prior to performing the method and may be used to determine if the predetermined product ion has been detected in the second mass spectral data. More than one predetermined product ion may be sought in the second mass spectral data. One or more potential precursor ion may be determined as being related to each predetermined product ion.

The separator may be a liquid chromatography device, a gas chromatography device, or a scanned differential mobility device such as a FAIMS device.

The step of providing a plurality of precursor ions may comprise: providing a plurality of different precursor ions to said separator and separating different precursor ions from each other in said separator; or providing analyte molecules to said separator, separating different analyte molecules from each other in said separator, and ionising said separated analyte molecules so as to provide said plurality of separated precursor ions.

Preferably, when said potential precursor ion is determined to be present, said potential precursor ion subjected to further analysis.

When said potential precursor ion is determined to be present, said potential precursor ion is preferably isolated from other precursor ions. The isolated potential precursor ion may then be fragmented or reacted so as to produce product ions, and these product ions may be analysed to obtain product ion data. The isolated potential precursor ion may then be identified using the product ion data. The isolated ions may be fragmented by a different fragmentation technique to the fragmentation technique used in the second mode of operation.

The method preferably comprises repeatedly alternating the method between said first and second modes of operation.

Preferably, said separator is an ion separator and the method comprises: repeatedly pulsing precursor ions into the ion separator, operating the method only in the first mode whilst ions from a first pulse elute from the ion separator and operating the method only in the second mode whilst ions from a second pulse elute from the ion separator.

The present invention also provides a mass spectrometer arranged and configured to perform any of the methods described above.

Accordingly, from the first aspect of the present invention there is provided a mass spectrometer comprising:

a separator for providing a plurality of separated precursor ions;

a mass analyser;

a reaction or fragmentation device;

an ion filter; and a controller arranged and adapted to:

mass analyse the separated precursor ions in the mass analyser in a first mode so as to obtain first mass spectral data; wherein the first mode comprises detecting precursor ions and recording an ion signal as a function of elution time of the separator;

perform a second mode of operation comprising subjecting the separated precursor ions to reactions or fragmentation in the reaction or fragmentation device so as to produce product ions, and mass analysing the product ions in the mass analyser so as to obtain second mass spectral data; wherein the second mode comprises detecting product ions and recording an ion signal as a function of elution time of the separator;

compare the first and second mass spectral data so as to identify a precursor ion in the first mass spectral data that has a pre-selected mass difference to a product ion in the second mass spectral data; and determine whether said precursor ion is a precursor ion of interest by comparing the ion signal obtained in the first mode with the ion signal obtained in the second mode;

wherein the spectrometer is configured such that when a precursor ion is determined to be an ion of interest, a third mode of operation is performed in which said precursor ion of interest is isolated from other precursor ions by said ion filter, the isolated precursor ion is then fragmented or reacted in a fragmentation or reaction device so as to produce product ions, and the product ions are analysed in an ion analyser so as to obtain product ion data.

The isolated precursor ion may be fragmented or reacted in the same fragmentation or reaction device used in the second mode of operation, or in a different device. The ion analyser may be said mass analyser or another ion analyser.

The mass spectrometer preferably comprises input means for inputting the pre-selected mass difference.

The mass spectrometer preferably comprises means for performing any one or combination of the methods described herein in relation to the first aspect of the present invention.

From the second aspect of the present invention there is provided a mass spectrometer comprising:

an ion source for generating a plurality of species of precursor ions;

separation means for varying the intensity profile of one or more species of precursor ions as a function of time;

a reaction of fragmentation device;

an ion filter; and a mass analyser;

wherein said mass spectrometer is arranged and adapted to:

mass analyse the precursor ions in the mass analyser so as to obtain first mass spectral data in a first mode of operation, said separation means varying the intensity profile of one or more species of precursor ions as a function of time so that different species of precursor ions are caused to have different intensity profiles as a function of time;

perform a second mode of operation comprising subjecting precursor ions to reactions or fragmentation in said reaction of fragmentation device so as to produce product ions, and mass analysing the product ions in the mass analyser so as to obtain second mass spectral data including intensity profiles that vary as a function of time;

compare the first and second mass spectral data so as to identify a precursor ion in the first mass spectral data that has a pre-selected mass difference to a product ion in the second mass spectral data; and determine whether said precursor ion is a precursor ion of interest by determining if the intensity profile of said precursor ion matches the intensity profile of said product ion;

wherein the spectrometer is configured such that when a precursor ion is determined to be an ion of interest, a third mode of operation is performed in which said precursor ion of interest is isolated from other precursor ions by said ion filter, the isolated precursor ion is then fragmented or reacted in a fragmentation or reaction device so as to produce product ions, and the product ions are analysed in an ion analyser so as to obtain product ion data.

The isolated precursor ion may be fragmented or reacted in the same fragmentation or reaction device used in the second mode of operation, or in a different device. The ion analyser may be said mass analyser or another ion analyser.

The mass spectrometer preferably comprises input means for inputting the pre-selected mass difference.

The mass spectrometer preferably comprises means for performing any one or combination of the methods described herein in relation to the first or second aspects of the present invention.

From the third aspect of the present invention there is provided a mass spectrometer comprising:

a separator for providing a plurality of separated precursor ions;

a mass analyser;

a reaction or fragmentation device;

an ion filter; and a controller arranged and adapted to:

transmit separated precursor ions into the reaction or fragmentation device and react or fragment the ions in a manner such that only some of the precursor ions fragment or react at any given time so as to result in both first precursor ions and first product ions;

mass analyse the first precursor ions and first product ions in the mass analyser so as to obtain mass spectral data;

wherein the mass analyser is configured to detect the first precursor ions and first product ions, and record an ion signal as a function of elution time of the separator;

compare the mass spectral data so as to identify a precursor ion in the mass spectral data that has a preselected mass difference to a product ion in the mass spectral data; and determine whether this precursor ion is an ion of interest by comparing the ion signal obtained for the identified precursor ion with the ion signal obtained for the product ion having the predetermined mass difference;

wherein the spectrometer is configured such that when a precursor ion is determined to be an ion of interest, a further mode of operation is performed in which said precursor ion of interest is isolated from other precursor ions by said ion filter, the isolated precursor ion is then fragmented or reacted in a fragmentation or reaction device so as to produce product ions, and the product ions are analysed in an ion analyser so as to obtain product ion data.

The isolated precursor ion may be fragmented or reacted in the same fragmentation or reaction device used in the second mode of operation, or in a different device. The ion analyser may be said mass analyser or another ion analyser.

From the fourth aspect of the present invention there is provided a mass spectrometer comprising:

a separator for providing a plurality of separated precursor ions;

a mass analyser;

a reaction or fragmentation device; and a controller arranged and adapted to:

mass analyse separated precursor ions in the mass analyser in a first mode so as to obtain first mass spectral data; wherein the first mode comprises detecting precursor ions and recording an ion signal as a function of elution time of the separator;

perform a second mode of operation comprising subjecting the separated precursor ions to reactions or fragmentation in the reaction or fragmentation device so as to produce product ions, and mass analysing the product ions in the mass analyser so as to obtain second mass spectral data; wherein the second mode comprises detecting product ions and recording an ion signal as a function of elution time of the separator;

determine if one or more predetermined product ion has been detected in the second mass spectral data; and determine whether a potential precursor ion of said predetermined product ion has been detected in said first mass spectral data by comparing the ion signal obtained in the first mode with the ion signal obtained in the second mode.

The mass spectrometer of the first or second aspect may comprise:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; and (xxvi) a Solvent Assisted Inlet Ionisation ("SAII") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wen filter; and/or (k) a device or ion gate for pulsing ions; and/or (l) a device for converting a substantially continuous ion beam into a pulsed ion beam.

The mass spectrometer may comprise either:

(i) a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

The mass spectrometer may comprise a device arranged and adapted to supply an AC or RF voltage to the electrodes. The AC or RF voltage preferably has an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak.

The AC or RF voltage preferably has a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

The mass spectrometer may comprise a chromatography or other separation device upstream of an ion source. According to an embodiment the chromatography separation device comprises a liquid chromatography or gas chromatography device. According to another embodiment the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

BRIEF DESCRIPTION OF THE DRAWINGS

Various embodiments of the present invention will now be described, by way of example only, and with reference to the accompanying drawings in which.

DETAILED DESCRIPTION OF PREFERRED EMBODIMENTS

A conventional method of $MS^e$ triggered DDA will first be described in order to help illustrate the advantages of the preferred embodiment of the present invention. According to a conventional $MS^e$ technique, an analyte solution elutes from a liquid chromatography device and is ionised. The resulting precursor ions then pass to a fragmentation device which alternates between a low fragmentation mode, which leaves the precursor ions substantially unfragmented, and a high fragmentation mode, which fragments the precursor ions to form product ions. The precursor ions and product ions are mass analysed in the two alternating modes so as to obtain precursor ion spectra and product ion spectra.

The precursor and product ion spectra are then interrogated to determine precursor ions which may be of interest. For example, a neutral loss may be considered to be indicative of a particular group of components of interest. Product and precursor ion populations in the $MS^e$ spectra data are therefore interrogated for potential neutral losses by looking for differences in mass to charge ratio values, that are associated with the target neutral loss, between peaks in the precursor and product ion spectra.

However, according to this conventional technique, precursor ions that are considered to be related to certain product ions may not actually be related to each them. For example, although the mass difference between a precursor ion and a product ion may correspond to the mass of a neutral that could be lost from the precursor ion, this does not necessarily mean that the product ion corresponds to the precursor ion with a neutral loss. It may be the case that the product ion is entirely unrelated to the precursor ion and it is merely a coincidence that the mass difference between the two ions corresponds to that of a neutral loss. It will be appreciated that when a complex mixture is analysed this will lead to the detection of many different peaks in the precursor and product ion spectra, and that there are therefore many different mass differences between any given precursor ion and the many product ions. This appearance of such many different mass differences increases the likelihood of product and precursor ions being deemed to be related simply because the mass differences between them are coincidentally the same as, for example, a neutral loss. This conventional method therefore suffers from relatively low specificity in complex mixtures.

Figure 1A:
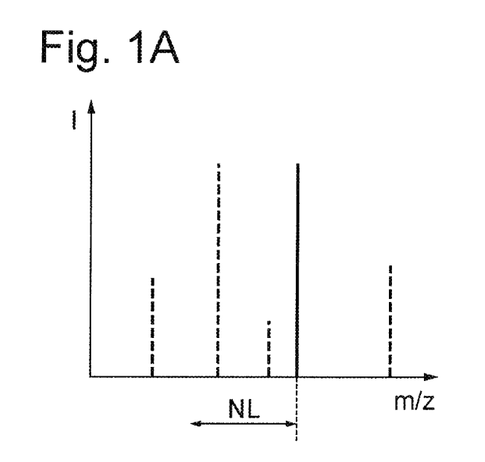
FIGS. 1A to 1D show a first embodiment of the present invention, wherein a precursor ion is detected as being related to a product ion.
Figure 1B:
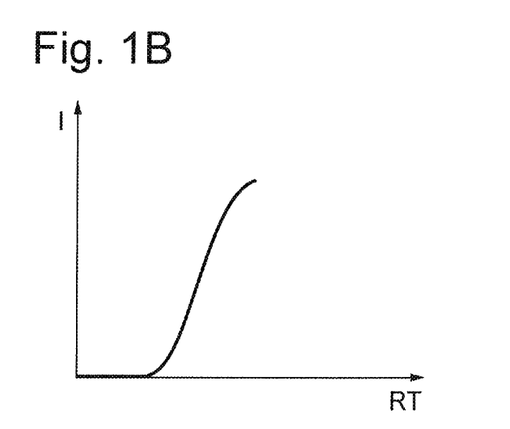
Figure 1C:
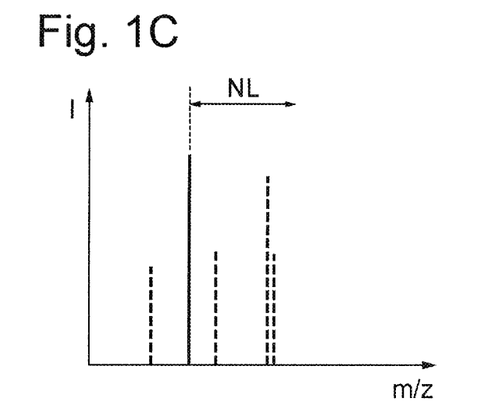
Figure 1D:
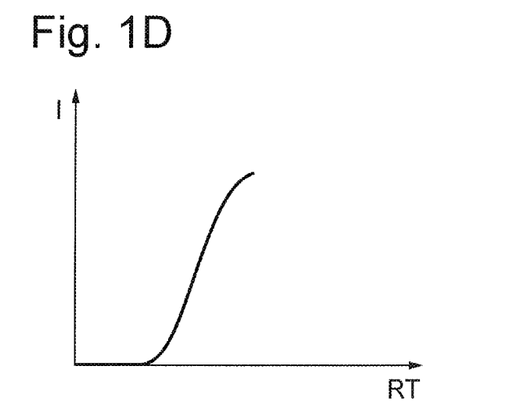

FIGS. 1A to 1D show an embodiment of an approach using the aforementioned neutral-loss triggered DDA technique. FIG. 1A shows an example of the mass spectral data obtained during a low fragmentation mode of the $MS^e$ technique. This graph represents the ion signal for the precursor ions. FIG. 1B shows the liquid chromatographic intensity profile as a function of retention time for the period over which the data of FIG. 1A is obtained. FIG. 1C shows an example of the mass spectral data obtained during a high fragmentation mode of the $MS^e$ technique. This graph represents the ion signal for the product ions. The spectral data obtained in FIG. 10 is obtained in the time period just before or after the time period over which the data in FIG. 1A was obtained. FIG. 1D shows the liquid chromatographic intensity profile as a function of retention time for the period over which the data of FIG. 10 is obtained.

According to this embodiment, the data in FIGS. 1A and 10 is compared and it is determined that the mass difference between a particular mass peak in FIG. 1A and a particular mass peak in FIG. 1C corresponds to the mass of a neutral group. This is shown by the mass difference 'NL' indicated between FIGS. 1A and 10. It is then considered possible that the precursor ion producing said particular mass peak in FIG. 1A has lost a neutral group during the high fragmentation mode so as to result in the mass peak in FIG. 1C.

The preferred embodiment is therefore substantially the same as the conventional $MS^e$ triggered DDA approach described above, up until this stage of the method. However, the preferred embodiment of the present invention then goes on to use the liquid chromatographic profiles to confirm that the precursor and product ions are related.

According to the preferred embodiment, the shape and/or retention time of the chromatographic profiles at the times during which the precursor ion and product ion were detected are compared. If the shapes and/or retention times of these profiles match then the precursor and product ions are considered to be related to each other. The shape and retention times of the chromatographic profiles in FIGS. 1B and 1D show that the precursor ions in FIG. 1A and the product ions in FIG. 10 are likely to be related to each other. It is therefore considered that the precursor ion in FIG. 1A is likely to be associated with the product ion in FIG. 10 and that the product ion corresponds to the precursor ion except with the neutral loss. This precursor ion is therefore considered to be an ion of interest and so is then isolated by the mass filter and subjected to fragmentation to produce fragment ions. The information in the resulting fragment ion mass spectra, together with the precursor ion information, leads to a highly specific/selective experiment.

Figure 2A:
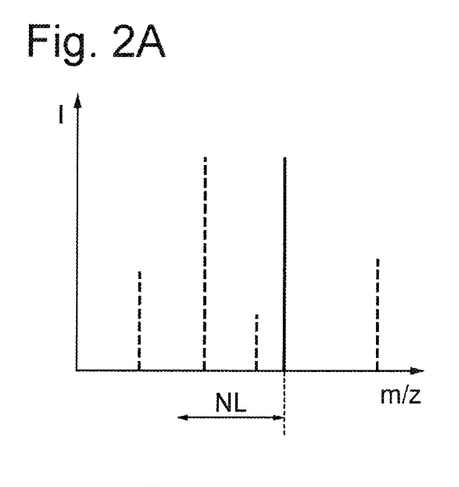
FIGS. 2A to 2D also show the first embodiment of the present invention, except wherein a precursor ion is detected as not being related to a product ion.
Figure 2B:
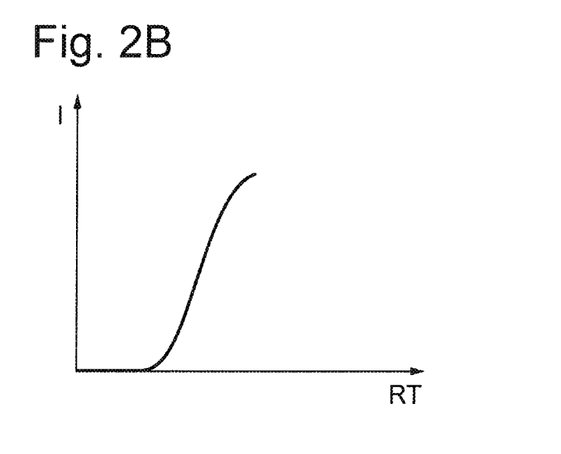
Figure 2C:
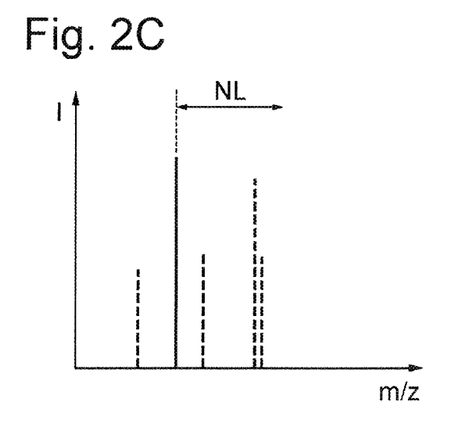
Figure 2D:
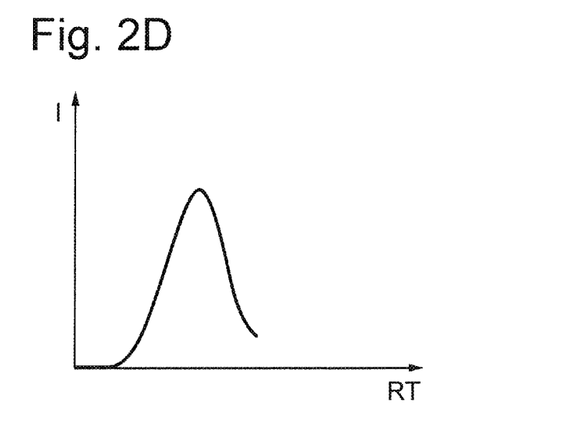

FIGS. 2A to 2D substantially correspond to FIGS. 1A to 1D respectively, except that the data indicates that a precursor ion and product ion are unlikely to be related to each other. FIG. 2A shows an example of the mass spectral data obtained during a low fragmentation mode of the $MS^e$ technique. This graph represents the ion signal for the precursor ions. FIG. 2B shows the liquid chromatographic intensity profile as a function of retention time for the period over which the data of FIG. 2A is obtained. FIG. 2C shows an example of the mass spectral data obtained during a high fragmentation mode of the $MS^e$ technique. This graph represents the ion signal for the product ions. FIG. 2D shows the liquid chromatographic intensity profile as a function of retention time for the period over which the data of FIG. 2C is obtained.

As in the previous embodiment, the data in FIGS. 2A and 2C is compared and it is determined that the mass difference between a particular mass peak in FIG. 2A and a particular mass peak in FIG. 2C corresponds to the mass of a neutral group. This is shown by the mass difference 'NL' indicated between FIGS. 2A and 2C. It is then considered possible that the precursor ion producing said particular mass peak in FIG. 2A has lost a neutral group during the high fragmentation mode so as to result in the mass peak in FIG. 2C.

However, the chromatographic profiles in FIGS. 2B and 2D have different shapes over different retention time periods. As such, it is considered that the precursor ions in FIG. 2A and the product ions in FIG. 2C are not likely to be related to each other. In other words, the chromatographic profile in FIG. 2B does not match that of FIG. 2D and so the precursor ions detected in FIG. 2A are considered to be unlikely to be associated with the product ions detected in FIG. 2D. Therefore, although the mass difference between a precursor ion in FIG. 2A and a product ion in FIG. 2C initially appears to indicate that the product ion corresponds to the precursor ion except with a neutral loss, this is not the case and is merely a coincidence. The precursor ion detected in FIG. 2A is therefore not considered to be an ion of interest and so it is not isolated by the mass filter and is not subjected to fragmentation to produce fragment ions. This illustrates the advantage of the preferred embodiment over conventional $MS^e$ triggered DDA, which would have concluded that the precursor and product ions were related.

The above described examples utilise chromatography to separate the precursor ions prior to $MS^e$ analysis. However, other types of separator may be used according to the present invention such as, for example, ion mobility separators and mass to charge ratio separators. When using ion separators that transmit the ions relatively quickly such as, for example, ion mobility separators, it may not be possible to switch between the high and low $MS^e$ fragmentation modes multiple times during each separation cycle. With these types of relatively fast ion separator, the separation cycle in the low fragmentation mode may be completed before switching to the separation cycle in the high fragmentation mode. The separation peaks may then be compared after the separation cycle in each mode has been completed, as will be described with reference to the example shown in FIGS. 3A-3D.

Figure 3A:
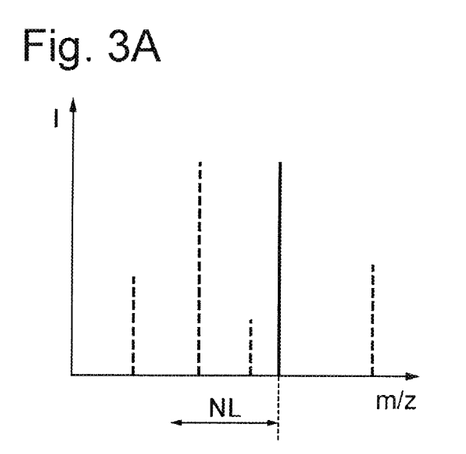
FIGS. 3A to 3D show a second embodiment of the present invention, wherein a precursor ion is detected as not being related to a product ion.
Figure 3B:
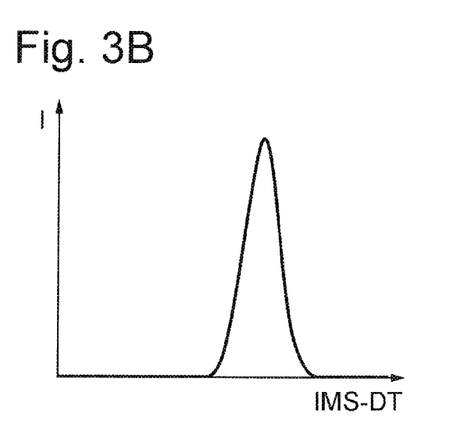
Figure 3C:
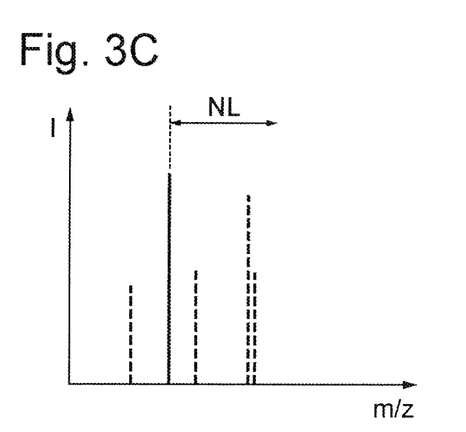
Figure 3D:
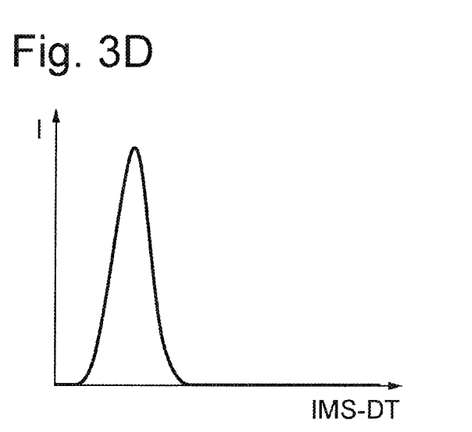

FIGS. 3A to 3D show data wherein the precursor ions are separated by an ion mobility separator (IMS), rather than a liquid chromatography column. FIG. 3A shows an example of the mass spectral data obtained during a low fragmentation mode. This graph represents the ion signal for the precursor ions exiting the IMS device during a full cycle of the IMS device. FIG. 3B shows the precursor ion intensity profile as a function of drift time through the IMS device for the period over which the data of FIG. 3A is obtained, i.e. for a full separation cycle of the IMS device. FIG. 3C shows an example of the mass spectral data obtained during a high fragmentation mode. This graph represents the ion signal for the product ions exiting the IMS device during a full cycle of the IMS device. FIG. 3D shows the product ion intensity profile as a function of drift time through the IMS device for the period over which the data of FIG. 3C is obtained, i.e. for a full separation cycle of the IMS device.

As in the other embodiments, the data in FIGS. 3A and 3C is compared and it is determined that the mass difference between a particular mass peak in FIG. 3A and a particular mass peak in FIG. 3C corresponds to the mass of a neutral group. This is shown by the mass difference 'NL' indicated between FIGS. 3A and 3C. It is then considered possible that the precursor ion producing said particular mass peak in FIG. 3A has lost a neutral group during the high fragmentation mode so as to result in the mass peak in FIG. 3C.

However, although the shape of the profiles in FIGS. 3B and 3D are the same, they have been detected over different retention time periods. As such, it is considered that the precursor ions in FIG. 3A and the product ions in FIG. 3C are not likely to be related to each other. In other words, the profile in FIG. 3B does not match that of FIG. 3D and so the precursor ions detected in FIG. 3A are considered to be unlikely to be associated with the product ions detected in FIG. 3D. Therefore, although the mass difference between a precursor ion in FIG. 3A and a product ion in FIG. 3C initially appears to indicate that the product ion corresponds to the precursor ion except with a neutral loss, this is not the case and is merely a coincidence. The precursor ion detected in FIG. 3A is therefore not considered to be an ion of interest and so it is not isolated by the mass filter and is not subjected to fragmentation to produce fragment ions.

On the other hand, if the profiles in FIGS. 3B and 3D were the same shape and detected over substantially the same retention time period then the precursor and product ions in FIGS. 3A and 3C would be considered to be likely to be related. It would be considered that the product ion corresponds to the precursor ion except with the neutral loss. This precursor ion would then be considered to be an ion of interest and this would trigger the precursor ion to be isolated by the mass filter and subjected to fragmentation to produce fragment ions. The information in the resulting fragment ion mass spectra, together with the precursor ion information would lead to a highly specific/selective experiment.

It may be desirable to maintain the fidelity of the ion separation through the ion separator, for example, using axial electric fields or by travelling one or more electrical potential barriers/wells along the device. This is particularly useful in relatively fast ion separators.

Although the present invention has been described with reference to preferred embodiments, it will be understood by those skilled in the art that various changes in form and detail may be made without departing from the scope of the invention as set forth in the accompanying claims.

For example, although the embodiments described are based on neutral loss triggered experiments, other types of transition may be detected so as to trigger the experiment such as, for example, precursor ion discovery or multiple reaction monitoring (MRM).

It is also contemplated that the invention may be operated with other DDA approaches, such as mass defect filters etc.

The above examples refer to adjacent $MS^e$ mass spectra being used to identify neutral losses. However, the comparison and identification need not be performed only on adjacent spectra, but may include multiple precursor and multiple product ion spectra.

The examples described produce a physical display of a profile along the separation axis. However, the 2D data set could be interrogated without the need to physically display the profile and some benefit obtained. For example, mathematical techniques may be used to negate the need to display or produce a profile and/or calculate and compare aspects of the profile. Cross correlation calculations may be used to compare the similarity of the data without the need to produce a profile.

The invention claimed is:

1. A method of mass spectrometry comprising: using a separator to provide a plurality of separated precursor ions; mass analysing the separated precursor ions in a first mode so as to obtain first mass spectral data; wherein the first mode comprises detecting precursor ions and recording an ion signal as a function of elution time of the separator; performing a second mode of operation comprising subjecting the separated precursor ions to reactions or fragmentation so as to produce product ions, and mass analysing the product ions so as to obtain second mass spectral data; wherein the second mode comprises detecting product ions and recording an ion signal as a function of elution time of the separator; selecting a predetermined mass difference desired to be detected between a precursor ion in the first mass spectral data and a product ion in the second mass spectral data; comparing the first and second mass spectral data; identifying a precursor ion in the first mass spectral data that has said predetermined mass difference to a product ion in the second mass spectral data using the comparison; determining whether said identified precursor ion is a precursor ion of interest by comparing the ion signal obtained in the first mode with the ion signal obtained in the second mode; and when it is determined that said identified precursor ion is a precursor ion of interest, performing a third mode comprising: isolating said precursor ion of interest from other precursor ions; fragmenting or reacting the isolated precursor ion so as to produce product ions; and analysing the product ions so as to obtain product ion data; and when it is determined that said identified precursor ion is a precursor ion of interest, not performing said third mode for said identified precursor ion.

2. The method of claim 1, further comprising identifying the isolated precursor ion using said product ion data.

3. The method of claim 1, wherein the separator is an ion mobility separator, a liquid chromatography device, a gas chromatography device, or a scanned differential mobility device.

4. The method of claim 1, wherein the step of providing a plurality of precursor ions comprises: providing a plurality of different precursor ions to said separator and separating different precursor ions from each other in said separator; or
providing analyte molecules to said separator, separating different analyte molecules from each other in said separator, and ionising said separated analyte molecules so as to provide said plurality of separated precursor ions.

5. The method of claim 1, wherein the step of determining whether the identified precursor ion is a precursor ion on interest comprises:
identifying at least a portion of the ion signal obtained in the first mode that corresponds to or includes said identified precursor ion;
identifying at least a portion of the ion signal obtained in the second mode that corresponds to or includes said product ion; and
comparing the elution times of these ion signals and/or comparing the shape of the intensity profiles of these ion signals and/or comparing a shape-related parameter of the intensity profiles of these ion signals.

6. The method of claim 5, wherein the identified precursor ion is considered to be a precursor ion of interest if the elution times of the ion signals match and/or the shapes of the intensity profiles match and/or the shape-related parameter of the intensity profiles match.

7. The method of claim 5, wherein said identified precursor ion is considered to be a precursor ion of interest if said at least a portion of the ion signal obtained in the first mode and said at least a portion of the ion signal obtained in the second mode have substantially the same elution time, or span over substantially the same range of elution times; and/or if the shape or shape-related parameter of said at least a portion of the ion signal obtained in the first mode matches the shape or shape-related parameter of said at least a portion of the ion signal obtained in the second mode over substantially the same elution time period.

8. The method of claim 1, wherein said ion signal obtained in the first mode that corresponds to or includes said identified precursor ion comprises a peak in the ion signal;

wherein said ion signal obtained in the second mode that corresponds to or includes said product ion comprises a peak in the ion signal; and wherein said step of determining whether said identified precursor ion is a precursor ion of interest comprises comparing the shape or shape-related parameter of only a portion of the peak obtained in the first mode with the shape or shape-related parameter of only a portion of the peak obtained in the second mode; and determining that said identified precursor ion is a precursor ion of interest when the shapes or shape-related parameter of the peak portions match.

9. The method of claim 8, comprising comparing the peak portions and switching to said third mode, if the shape or shape-related parameters of the peak portions match, before one or both peaks have fully eluted from the separator.

10. The method of claim 1, comprising repeatedly alternating the method between said first and second modes of operation.

11. The method of claim 10, wherein the method is continuously alternated between the first and second modes, and then: when a precursor ion is determined to be a precursor ion of interest, the method switches from either said first or said second mode into said third mode such that said precursor ion is then isolated from other precursor ions and is fragmented or reacted so as to produce said product ion data; and when a precursor ion is determined not to be a precursor ion of interest, the method continues to continuously alternate between the first and second modes.

12. The method of claim 11, wherein the precursor ion is determined to be a precursor ion of interest and the method switches to said third mode substantially in real time.

13. The method of claim 1, wherein said separator is an ion separator and the method comprises: repeatedly pulsing precursor ions into the ion separator, operating the method only in the first mode whilst ions from a first pulse elute from the ion separator and operating the method only in the second mode whilst ions from a second pulse elute from the ion separator.

14. The method of claim 1, wherein said predetermined mass difference is a mass that represents a neutral loss that is known to occur from at least one of said precursor ions when subjected to said reactions or fragmentation in the second mode of operation.

15. A method of mass spectrometry comprising: generating a plurality of species of precursor ions; mass analysing the precursor ions so as to obtain first mass spectral data; varying the intensity profile of one or more species of precursor ions as a function of time so that different species of precursor ions are caused to have different intensity profiles as a function of time; performing a second mode of operation comprising subjecting precursor ions to reactions or fragmentation so as to produce product ions, and mass analysing the product ions so as to obtain second mass spectral data including intensity profiles that vary as a function of time; selecting a predetermined mass difference desired to be detected between a precursor ion in the first mass spectral data and a product ion in the second mass spectral data; comparing the first and second mass spectral data; identifying a precursor ion in the first mass spectral data that has said predetermined mass difference to a product ion in the second mass spectral data using the comparison; determining whether said identified precursor ion is a precursor ion of interest by determining if the intensity profile of said identified precursor ion matches the intensity profile of said product ion; and when it is determined that said identified precursor ion is a precursor ion of interest, performing a third mode comprising: isolating said identified precursor ion of interest from other precursor ions, fragmenting or reacting the isolated precursor ion so as to produce product ions; and analysing the product ions so as to obtain product ion data; and when it is determined that said identified precursor ion is not a precursor ion of interest, not performing said third mode for said identified precursor ion.

16. The method of claim 15, wherein said step of varying the intensity profile of one or more species of precursor ions as a function of time comprises subjecting an analyte sample to chromatography; and wherein said identified precursor ion is matched to said product ion by matching chromatographic elution time profiles of the identified precursor ion and product ion; or wherein said step of varying the intensity profile of one or more species of precursor ions as a function of time comprises separating the precursor ions in an ion mobility spectrometer, and wherein the identified precursor ion is matched to the product ion by matching ion mobility drift time profiles of the identified precursor ion and product ion.

17. A method of mass spectrometry comprising: using a separator to provide a plurality of separated precursor ions; passing the separated precursor ions into a fragmentation or reaction region and fragmenting or reacting the ions in a manner such that only some of the precursor ions fragment or react at any given time so as to result in both first precursor ions and first product ions; mass analysing the first precursor ions and first product ions so as to obtain mass spectral data; wherein the mass analysis comprises detecting the first precursor ions and first product ions, and recording an ion signal as a function of elution time of the separator; selecting a predetermined mass difference desired to be detected between a precursor ion in the mass spectral data and a product ion in the mass spectral data; comparing the mass spectral data; identifying a precursor ion in the mass spectral data that has said predetermined mass difference to a product ion in the mass spectral data using the comparison; determining whether said identified precursor ion is a precursor ion of interest by comparing the ion signal obtained for the identified precursor ion with the ion signal obtained for the product ion having the predetermined mass difference; and when it is determined that said identified precursor ion is a precursor ion of interest, performing a mode comprising: isolating said identified precursor ion of interest from other precursor ions, fragmenting or reacting the isolated precursor ion so as to produce product ions, and analysing the product ions so as to obtain product ion data; and when it is determined that said identified precursor ion is not a precursor ion of interest, not performing said mode for said identified precursor ion.

18. A method of mass spectrometry comprising: using a separator to provide a plurality of separated precursor ions; mass analysing the separated precursor ions in a first mode so as to obtain first mass spectral data; wherein the first mode comprises detecting precursor ions and recording an ion signal as a function of elution time of the separator; performing a second mode of operation comprising subjecting the separated precursor ions to reactions or fragmentation so as to produce product ions, and mass analysing the product ions so as to obtain second mass spectral data; wherein the second mode comprises detecting product ions and recording an ion signal as a function of elution time of the separator; determining if one or more predetermined product ion has been detected in the second mass spectral data; and determining whether a potential precursor ion of said predetermined product ion has been detected in said first mass spectral data by comparing the ion signal obtained in the first mode with the ion signal obtained in the second mode; and when it is determined that said potential precursor ion has been detected, performing a third mode comprising: isolating said potential precursor ion from other precursor ions; fragmenting or reacting said potential precursor ion so as to produce product ions, and analysing the resulting product ions so as to obtain product ion data; and when it is determined that said potential precursor ion has not been detected, not performing said third mode for said potential precursor ion.

19. The method of claim 18, further comprising identifying the potential precursor ion using the product ion data.

20. The method of claim 18, further comprising identifying at least a portion of the ion signal obtained in the second mode that corresponds to or includes said predetermined product ion; and determining a precursor ion in the ion signal obtained in the first mode as said potential precursor ion if its ion signal has an elution time and/or intensity profile shape that corresponds to an elution time and/or intensity profile shape of the ion signal for the predetermined product ion.

\* \* \* \* \*